US009838659B2

(12) United States Patent
Imade

(10) Patent No.: US 9,838,659 B2
(45) Date of Patent: Dec. 5, 2017

(54) IMAGE PROCESSING DEVICE AND IMAGE PROCESSING METHOD

(71) Applicant: OLYMPUS CORPORATION, Tokyo (JP)

(72) Inventor: Shinichi Imade, Iruma (JP)

(73) Assignee: OLYMPUS CORPORATION, Tokyo (JP)

( * ) Notice: Subject to any disclaimer, the term of this patent is extended or adjusted under 35 U.S.C. 154(b) by 56 days.

(21) Appl. No.: 14/964,834

(22) Filed: Dec. 10, 2015

(65) Prior Publication Data

US 2016/0094817 A1    Mar. 31, 2016

Related U.S. Application Data

(63) Continuation of application No. PCT/JP2014/061514, filed on Apr. 24, 2014.

(30) Foreign Application Priority Data

Jun. 26, 2013   (JP) ................ 2013-133919

(51) Int. Cl.
*H04N 9/64* (2006.01)
*G06T 3/40* (2006.01)
(Continued)

(52) U.S. Cl.
CPC .......... *H04N 9/646* (2013.01); *G06T 3/4015* (2013.01); *H04N 9/045* (2013.01); *H04N 9/07* (2013.01); *H04N 2209/046* (2013.01)

(58) Field of Classification Search
CPC .... H04N 9/07; H04N 9/045; H04N 2209/046; H04N 9/646; G06T 3/4015
See application file for complete search history.

(56) References Cited

U.S. PATENT DOCUMENTS 4,734,571 A    3/1988   Hamada et al.
7,397,499 B2*  7/2008   Okada ................ H04N 5/23248
                                                        348/208.13

(Continued)

FOREIGN PATENT DOCUMENTS

JP    S62-103615 A    5/1987
JP    2001-174696 A   6/2001
(Continued)

OTHER PUBLICATIONS

International Search Report dated Aug. 5, 2014 issued in PCT/JP2014/061514.

*Primary Examiner* — Lin Ye
*Assistant Examiner* — Chriss Yoder, III
(74) *Attorney, Agent, or Firm* — Scully, Scott, Murphy & Presser, P.C.

(57) ABSTRACT

An image processing device includes a processor including hardware. The processor is configured to implement an image acquisition process that acquires an image captured by an image sensor that includes a first-color filter having first transmittance characteristics, a second-color filter having second transmittance characteristics, and a third-color filter having third transmittance characteristics, and a correction process that multiplies a pixel value that corresponds to a second color by a first coefficient to calculate a component value that corresponds to the overlapping region of the first transmittance characteristics and the third transmittance characteristics, and corrects a pixel value that corresponds to a first color, the pixel value that corresponds to the second color, and a pixel value that corresponds to a third color based on the component value that corresponds to the overlapping region. The second color is longer in wavelength than the first color and shorter in wavelength than the third color.

11 Claims, 11 Drawing Sheets

(51) Int. Cl.
*H04N 9/07* (2006.01)
*H04N 9/04* (2006.01)

(56) References Cited

U.S. PATENT DOCUMENTS

| | | | |
|---|---|---|---|
| 8,878,958 B2* | 11/2014 | Ichiyama | H04N 9/68 348/225.1 |
| 2011/0017923 A1 | 1/2011 | Kubo et al. | |
| 2011/0068251 A1 | 3/2011 | Narui | |
| 2011/0109749 A1* | 5/2011 | Chanas | H04N 5/232 348/164 |

FOREIGN PATENT DOCUMENTS

| | | |
|---|---|---|
| JP | 2002-142228 A1 | 5/2005 |
| JP | 2005-223700 A | 8/2005 |
| JP | 4118916 B2 | 7/2008 |
| JP | 2009-122524 A | 6/2009 |
| JP | 4585050 B1 | 11/2010 |
| JP | 2011-061767 A1 | 3/2011 |
| JP | 2012-220790 A | 11/2012 |
| JP | 2012-252280 A | 12/2012 |

* cited by examiner

IMAGE PROCESSING DEVICE AND IMAGE PROCESSING METHOD

CROSS REFERENCE TO RELATED APPLICATION

This application is a continuation of International Patent Application No. PCT/JP2014/061514, having an international filing date of Apr. 24, 2014, which designated the United States, the entirety of which is incorporated herein by reference. Japanese Patent Application No. 2013-133919 filed on Jun. 26, 2013 is also incorporated herein by reference in its entirety.

BACKGROUND

The present invention relates to an image processing device, an image processing method, and the like.

An image sensor that includes RGB color filters has been widely used for an imaging device. The amount of light that passes through the color filter increases (i.e., sensitivity increases) as the band of the color filter becomes wider. Therefore, a normal image sensor is designed so that the transmittance characteristics of the RGB color filters overlap each other.

JP-A-2001-174696 discloses a method that implements a phase difference detection process using a pupil division technique. According to the method disclosed in JP-A-2001-174696, RGB images are captured in a state in which the right pupil allows R and G to pass through, and the left pupil allows G and B to pass through, and the phase difference between the R image and the B image that produce parallax is detected.

SUMMARY

According to one aspect of the invention, there is provided an image processing device comprising:

a processor comprising hardware, the processor being configured to implement:

an image acquisition process that acquires an image captured by an image sensor, the image sensor including a first-color filter that has first transmittance characteristics, a second-color filter that has second transmittance characteristics, and a third-color filter that has third transmittance characteristics; and a correction process that estimates a component value that corresponds to an overlapping region of the first transmittance characteristics and the third transmittance characteristics based on a pixel value that corresponds to a second color among a pixel value that corresponds to a first color, the pixel value that corresponds to the second color, and a pixel value that corresponds to a third color that form the image, and corrects the pixel value that corresponds to the first color, the pixel value that corresponds to the second color, and the pixel value that corresponds to the third color based on the component value that corresponds to the overlapping region, the second color being a color that is longer in wavelength than the first color and is shorter in wavelength than the third color, and the processor being configured to implement the correction process that multiplies the pixel value that corresponds to the second color by a first coefficient based on the first transmittance characteristics and the third transmittance characteristics to calculate the component value that corresponds to the overlapping region.

According to another aspect of the invention, there is provided an image processing method comprising:

acquiring an image captured by an image sensor, the image sensor including a first-color filter that has first transmittance characteristics, a second-color filter that has second transmittance characteristics, and a third-color filter that has third transmittance characteristics; and estimating a component value that corresponds to an overlapping region of the first transmittance characteristics and the third transmittance characteristics by multiplying a pixel value that corresponds to a second color (among a pixel value that corresponds to a first color, the pixel value that corresponds to the second color, and a pixel value that corresponds to a third color that form the image) by a first coefficient based on the first transmittance characteristics and the third transmittance characteristics, and correcting the pixel value that corresponds to the first color, the pixel value that corresponds to the second color, and the pixel value that corresponds to the third color based on the component value that corresponds to the overlapping region, the second color being a color that is longer in wavelength than the first color and is shorter in wavelength than the third color.

DESCRIPTION OF EXEMPLARY EMBODIMENTS

Figure 1:
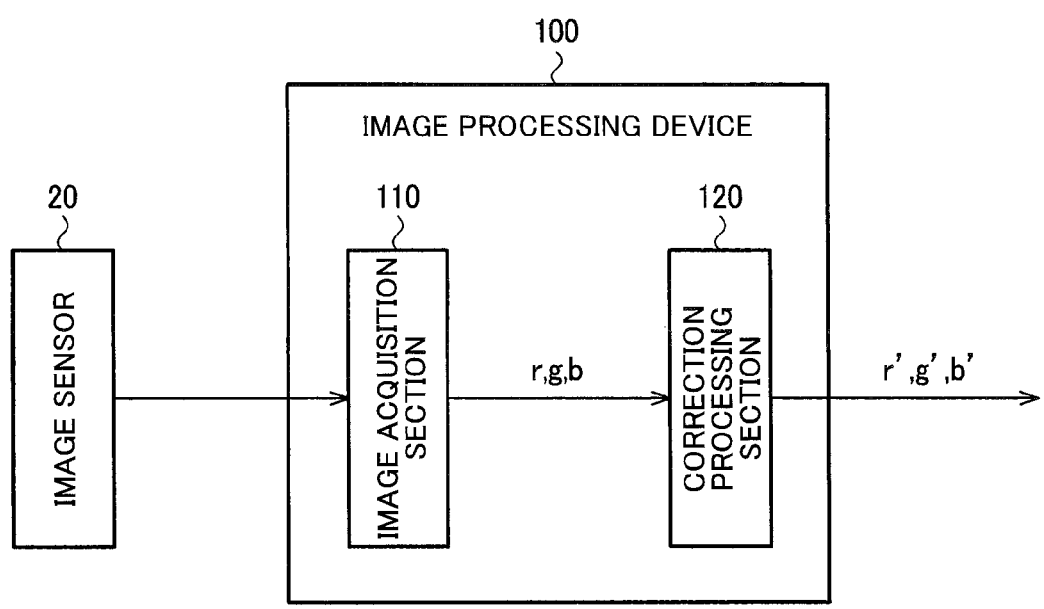
FIG. 1 illustrates a basic configuration example of an imaging device.

Several aspects of the invention may provide an image processing device, an image processing method, and the like that can acquire a high-color-purity image from an image captured using color filters for which the transmittance characteristics overlap each other.

According to one aspect of the invention, an image processing device includes:

a processor comprising hardware, the processor being configured to implement:

an image acquisition process that acquires an image captured by an image sensor, the image sensor including a first-color filter that has first transmittance characteristics, a second-color filter that has second transmittance characteristics, and a third-color filter that has third transmittance characteristics; and a correction process that estimates a component value that corresponds to an overlapping region of the first transmittance characteristics and the third transmittance characteristics based on a pixel value that corresponds to a second color among a pixel value that corresponds to a first color, the pixel value that corresponds to the second color, and a pixel value that corresponds to a third color that form the image, and corrects the pixel value that corresponds to the first color, the pixel value that corresponds to the second color, and the pixel value that corresponds to the third color based on the component value that corresponds to the overlapping region.

According to another aspect of the invention, an image processing method includes:

acquiring an image captured by an image sensor, the image sensor including a first-color filter that has first transmittance characteristics, a second-color filter that has second transmittance characteristics, and a third-color filter that has third transmittance characteristics; and estimating a component value that corresponds to an overlapping region of the first transmittance characteristics and the third transmittance characteristics based on a pixel value that corresponds to a second color among a pixel value that corresponds to a first color, the pixel value that corresponds to the second color, and a pixel value that corresponds to a third color that form the image, and correcting the pixel value that corresponds to the first color, the pixel value that corresponds to the second color, and the pixel value that corresponds to the third color based on the component value that corresponds to the overlapping region.

According to these aspects of the invention, the component value that corresponds to the overlapping region of the first transmittance characteristics and the third transmittance characteristics is estimated based on the pixel value that corresponds to the second color, and the pixel value that corresponds to the first color, the pixel value that corresponds to the second color, and the pixel value that corresponds to the third color are corrected based on the estimated component value that corresponds to the overlapping region. This makes it possible to acquire a high-color-purity image from an image captured using color filters for which the transmittance characteristics overlap each other.

Exemplary embodiments of the invention are described in detail below. Note that the following exemplary embodiments do not in any way limit the scope of the invention defined by the claims laid out herein. Note also that all of the elements described below in connection with the exemplary embodiments should not necessarily be taken as essential elements of the invention.

1. Outline

An outline of several embodiments of the invention is described below. Although an example that utilizes an image sensor that includes an RGB Bayer color filter array is described below, the embodiments of the invention are not limited thereto. It suffices that the image sensor include color filters that overlap each other with respect to the wavelength band.

Figure 2:
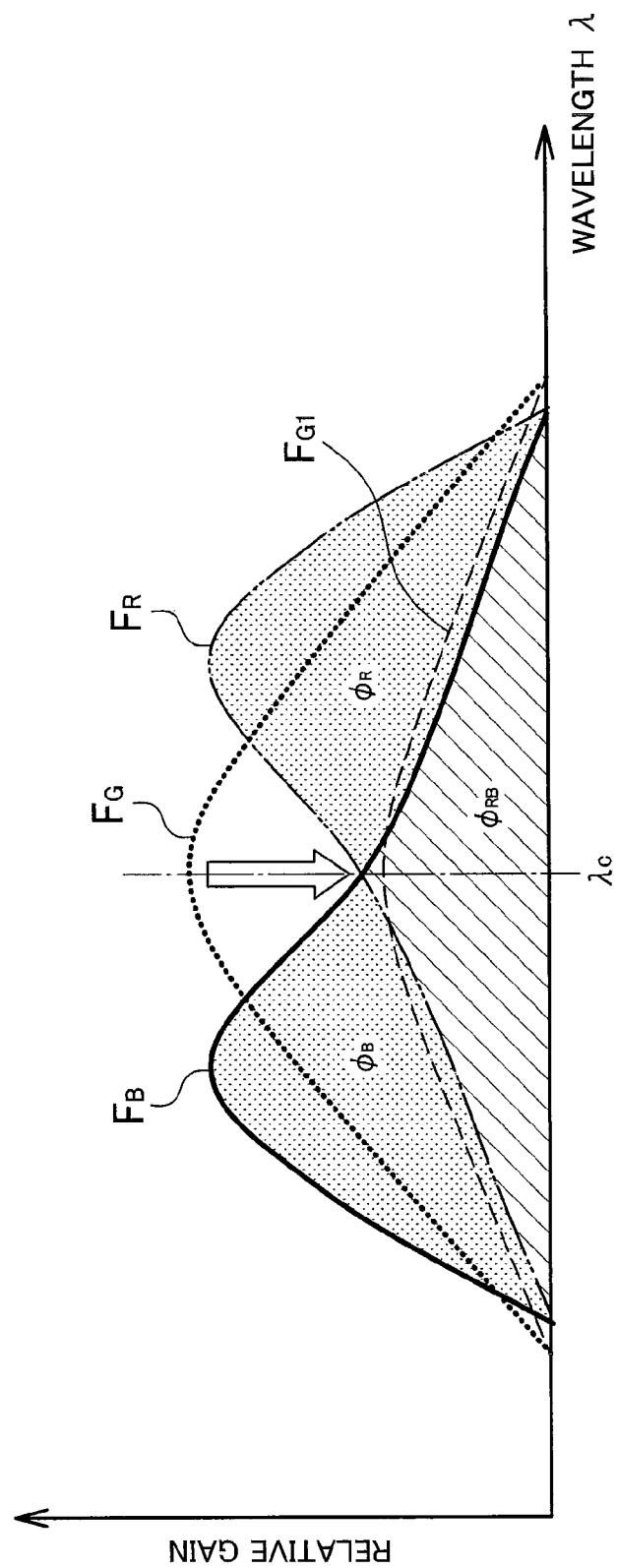
FIG. 2 is a view illustrating a method that calculates a high-color-reproduction image.

FIG. 2 schematically illustrates the transmittance characteristics of the color filters included in the image sensor. In FIG. 2, $F_B$ is the transmittance characteristics of a blue color filter, $F_G$ is the transmittance characteristics of a green color filter, and $F_R$ is the transmittance characteristics of a red color filter. Since the transmittance characteristics $F_B$, $F_G$, and $F_R$ overlap each other, color mixing occurs. For example, since the blue transmittance characteristics $F_B$ and the red transmittance characteristics $F_R$ overlap each other in the region $\phi_{RB}$, blue-wavelength light also reaches a red pixel (i.e., leakage of light occurs), and the component of the blue light is mixed into the red pixel value. It is difficult to accurately reproduce the color of the object when color separation is indefinite It is possible to improve color reproducibility by narrowing the band of the transmittance characteristics $F_B$, $F_G$, and $F_R$ so that the transmittance characteristics $F_B$, $F_G$, and $F_R$ overlap each other to only a small extent. In this case, however, the amount of light that passes through the color filter decreases since the color filter has a narrow band, and it is difficult to achieve high sensitivity. An image sensor is normally designed so that the transmittance characteristics $F_B$, $F_G$, and $F_R$ overlap each other in order to achieve high sensitivity. However, since color reproducibility significantly deteriorates if the transmittance characteristics $F_B$, $F_G$, and $F_R$ overlap each other to a large extent, the transmittance characteristics are determined taking account of the balance between color reproducibility and sensitivity. Specifically, it has been difficult to capture an image while achieving high sensitivity and high color reproducibility in combination.

As illustrated in FIG. 1, an image processing device 100 according to one embodiment of the invention includes an image acquisition section 110 and a correction processing section 120. The image acquisition section 110 acquires an image captured by an image sensor 20 that includes a first-color (blue) filter that has first transmittance characteristics $F_B$, a second-color (green) filter that has second transmittance characteristics $F_G$, and a third-color (red) filter that has third transmittance characteristics $F_R$. The correction processing section 120 estimates a component value $I \cdot \phi_{RB}$ (where, I is the incident light intensity) that corresponds to the overlapping region of the first transmittance characteristics $F_B$ and the third transmittance characteristics $F_R$ based on a pixel value g that corresponds to a second color among a pixel value b that corresponds to a first color, the pixel value g that corresponds to the second color, and a pixel value r that corresponds to a third color that form the image, and corrects the pixel value b that corresponds to the first color, the pixel value g that corresponds to the second color, and the pixel value r that corresponds to the third color based on the component value $I \cdot \phi_{RB}$ that corresponds to the overlapping region.

This makes it possible to implement a correction process that reduces (or cancels) the overlapping component (e.g., $I \cdot \phi_{RB}$) of the pixel value b that corresponds to the first color, the pixel value g that corresponds to the second color, and the pixel value r that corresponds to the third color. Therefore, it is possible to obtain an image having high color purity (that is obtained using color filters for which the transmittance characteristics overlap each other to only a small extent) from the high-sensitivity captured image captured using the color filters for which the transmittance characteristics $F_B$, $F_G$, and $F_R$ overlap each other.

Figure 3:
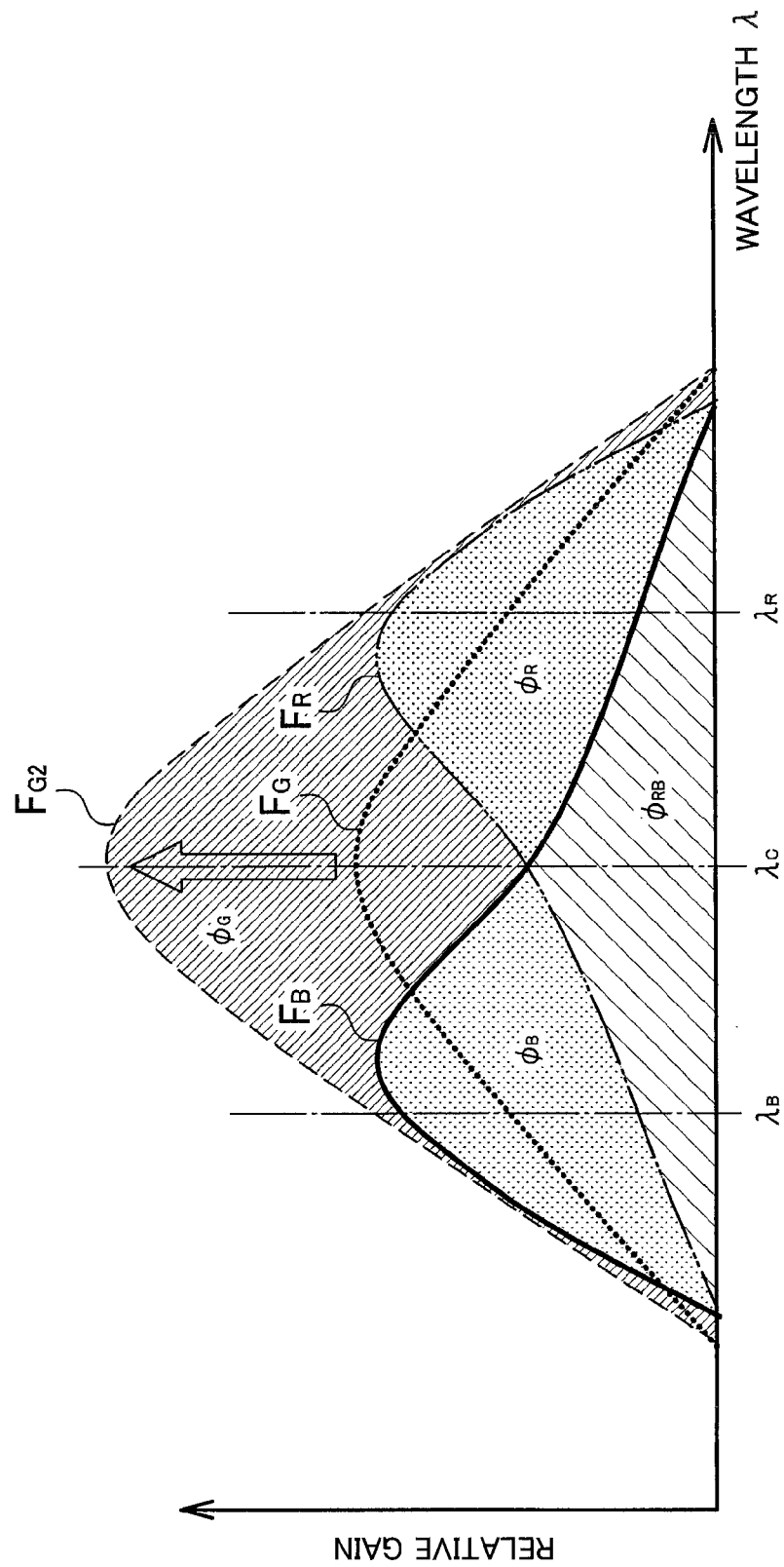
FIG. 3 is a view illustrating a method that calculates a high-color-reproduction image.

The above configuration is described in detail below (see the following embodiments). As illustrated in FIG. 2, a normal image sensor is designed so that the overlapping region $\phi_{RB}$ of the transmittance characteristics $F_B$ and the transmittance characteristics $F_R$ is similar to the green (second color) transmittance characteristics $F_G$, and the component value $I \cdot \phi_{RB}$ that corresponds to the overlapping region $\phi_{RB}$ is estimated based on the green pixel value g. The component value $I \cdot \phi_{RB}$ is subtracted from the pixel values b and r to obtain corrected blue and red pixel values {b', r'}={$I \cdot \phi_B$, $I \cdot \phi_R$}. As illustrated in FIG. 3, when the gain of the green (second color) transmittance characteristics $F_G$ is increased ($F_{G2}$), the blue transmittance characteristics $F_B$ and the red transmittance characteristics $F_R$ can be covered. Therefore, the component value of the transmittance characteristics $F_{G2}$ is calculated based on the gain and the green pixel value g. The component values $I \cdot \phi_B$ and $I \cdot \phi_R$ are subtracted from the component value of the transmittance characteristics $F_{G2}$ to obtain a corrected green pixel value $g' = I \cdot \phi_G$.

Specifically, the pixel value b that corresponds to the first color, the pixel value g that corresponds to the second color, and the pixel value r that corresponds to the third color are corrected based on the component value $I \cdot \phi_{RB}$ that corresponds to the overlapping region to calculate the corrected pixel values $\{b', g', r'\} = \{I \cdot \phi_B, I \cdot \phi_G, I \cdot \phi_R\}$. The corrected pixel values $I \cdot \phi_B$, $I \cdot \phi_G$, and $I \cdot \phi_R$ are pixel values for which the overlapping region of the transmittance characteristics $F_B$, $F_G$, and $F_R$ of the color filters has been removed. This makes it possible to generate a high-color-reproduction image from a high-sensitivity captured image.

The image processing device 100 may be configured as described below. Specifically, the image processing device 100 may include a memory that stores information (e.g., a program and various types of data), and a processor (i.e., a processor including hardware) that operates based on the information stored in the memory. The processor is configured to implement an image acquisition process that acquires an image captured by the image sensor 20 that includes the first-color filter that has the first transmittance characteristics $F_B$, the second-color filter that has the second transmittance characteristics $F_G$, and the third-color filter that has the third transmittance characteristics $F_R$, and a correction process that estimates the component value $I \cdot \phi_{RB}$ that corresponds to the overlapping region of the first transmittance characteristics $F_B$ and the third transmittance characteristics $F_R$ based on the pixel value g that corresponds to the second color among the pixel value b that corresponds to the first color, the pixel value g that corresponds to the second color, and the pixel value r that corresponds to the third color that form the image, and corrects the pixel value b that corresponds to the first color, the pixel value g that corresponds to the second color, and the pixel value r that corresponds to the third color based on the component value $I \cdot \phi_{RB}$ that corresponds to the overlapping region. The second color is a color that is longer in wavelength than the first color and is shorter in wavelength than the third color. The processor is configured to implement the correction process that multiplies the pixel value g that corresponds to the second color by the first coefficient based on the first transmittance characteristics $F_B$ and the third transmittance characteristics $F_R$ to calculate the component value $I \cdot \phi_{RB}$ that corresponds to the overlapping region.

The processor may implement the function of each section by individual hardware, or may implement the function of each section by integrated hardware, for example. The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The memory may be a semiconductor memory (e.g., SRAM or DRAM), a register, a magnetic storage device (e.g., hard disk drive), or an optical storage device (e.g., optical disk device). For example, the memory stores a computer-readable instruction. Each section of the imaging device (i.e., the image processing device (e.g., the image processing device 100 illustrated in FIG. 6) included in the imaging device) is implemented by causing the processor to execute the instruction. The instruction may be an instruction included in an instruction set that is included in a program, or may be an instruction that causes a hardware circuit included in the processor to operate.

The operation according to the embodiments of the invention is implemented as described below, for example. An image captured by the image sensor 20 is stored in the storage section. The processor reads (acquires) the image from the storage section, and acquires the pixel value b that corresponds to the first color, the pixel value g that corresponds to the second color, and the pixel value r that corresponds to the third color (of each pixel) from the image. The first coefficient based on the first transmittance characteristics $F_B$ and the third transmittance characteristics $F_R$ is stored in the storage section. The processor reads the first coefficient from the storage section, multiplies the pixel value g that corresponds to the second color by the first coefficient to calculate the component value $I \cdot \phi_{RB}$ that corresponds to the overlapping region, and stores the component value $I \cdot \phi_{RB}$ that corresponds to the overlapping region in the storage section.

Each section of the image processing device 100 is implemented as a module of a program that operates on the processor. For example, the image acquisition section 100 is implemented as an image acquisition module that acquires an image captured by the image sensor 20 that includes the first-color filter that has the first transmittance characteristics $F_B$, the second-color filter that has the second transmittance characteristics $F_G$, and the third-color filter that has the third transmittance characteristics $F_R$. Likewise, the correction processing section 120 is implemented as a correction processing module that multiplies the pixel value g that corresponds to the second color among the pixel value b that corresponds to the first color, the pixel value g that corresponds to the second color, and the pixel value r that corresponds to the third color that form the image by the first coefficient based on the first transmittance characteristics $F_B$ and the third transmittance characteristics $F_R$ to calculate the component value $I \cdot \phi_{RB}$ that corresponds to the overlapping region of the first transmittance characteristics $F_B$ and the third transmittance characteristics $F_R$.

2. First Embodiment 2.1. Spectral Separation Method that Achieves High Purity

A first embodiment of the invention is described in detail below. Note that the image sensor 20 is hereinafter appropriately referred to as "image sensor". The transmittance characteristics (spectral characteristics) $\{F_B, F_G, F_R, F_{G1}, F_{G2}\}$ and the regions $\{\phi_B, \phi_G, \phi_R, \phi_{RB}\}$ of the transmittance characteristics are functions of the wavelength $\lambda$, but the transmittance characteristics $F_B(\lambda)$ and the like are referred to as the transmittance characteristics $F_B$ and the like for convenience of explanation. The values $\{I \cdot \phi_B, I \cdot \phi_G, I \cdot \phi_R, I \cdot \phi_{RB}\}$ obtained by multiplying the values $\{\phi_B, \phi_G, \phi_R, \phi_{RB}\}$ by the light intensity I (followed by integration using the wavelength $\lambda$) are pixel values or component values.

A method that simultaneously acquires a high-sensitivity image and a high-color-reproduction image is described below. As illustrated in FIGS. 2 and 3, the transmittance characteristics $F_B$, $F_G$, and $F_R$ of the color filters of the image sensor are divided into four regions $\phi_R$, $\phi_{RB}$, $\phi_B$, and $\phi_G$. The region $\phi_{RB}$ is a region in which the transmittance characteristics $F_B$ and $F_R$ overlap each other. The region $\phi_R$ is a region obtained by removing the region $\phi_{RB}$ (overlapping region) from the transmittance characteristics $F_R$. The region $\phi_B$ is a region obtained by removing the region $\phi_{RB}$ (overlapping region) from the transmittance characteristics $F_B$. The region $\phi_G$ is a region obtained by removing the regions $\phi_R$, $\phi_{RB}$, and $\phi_B$ from the characteristics $F_{G2}$ obtained by increasing the gain of the transmittance characteristics $F_G$ so as to include the transmittance characteristics $F_B$ and $F_R$.

When the regions $\phi_R$, $\phi_B$, and $\phi_G$ are considered to be a light intensity component of light that has passed through filters having high-purity primary-color (RGB) spectral characteristics, a high-color-reproduction image can be obtained if the characteristics of the regions $\phi_R$, $\phi_B$, and $\phi_G$ can be calculated in advance.

A method that extracts red and blue high-purity pixel values $\{r', b'\} = \{I \cdot \phi_R, I \cdot \phi_B\}$ is described below with reference to FIG. 2. A color image sensor that is widely used is characterized in that the spectral characteristics $F_{RG}$ of the overlapping region $\phi_{RB}$ and the spectral characteristics $F_G$ of the green color filter have high similarity. Therefore, the region $\phi_{RB}$ can be approximated using the following expression (1). Note that the coefficient $\alpha$ is calculated as described later.

$$\phi_{RB} \approx F_{G1} = \alpha \cdot F_G,$$

$$0 < \alpha < 1.0 \tag{1}$$

The regions $\phi_R$ and $\phi_B$ are calculated from the region $\phi_{RB}$ calculated using the expression (1). As illustrated in FIG. 2, the following expression (2) is satisfied.

$$F_R = \phi_R + \phi_{RB},$$

$$F_B = \phi_B + \phi_{RB} \tag{2}$$

Since the following expression (3) is satisfied in view of the expressions (1) and (2), the regions $\phi_R$ and $\phi_B$ can be calculated.

$$\phi_R = F_R - \phi_{RB} \approx F_R - \alpha \cdot F_G,$$

$$\phi_B F_B = \phi_{RB} \approx F_B - \alpha F_G \tag{3}$$

When the intensity of light incident on each pixel of the image sensor is referred to as I, the values represented by the following expression (4) are obtained as the RGB pixel values of each pixel.

$$r = I \cdot F_R,$$

$$g = I \cdot F_G,$$

$$b = I \cdot F_B \tag{4}$$

Specifically, the high-purity pixel values r' and b' are calculated using the following expression (5) in view of the expressions (3) and (4).

$$r' = I \cdot \phi_R \approx r - \alpha \cdot g,$$

$$b' = I \cdot \phi_B \approx b - \alpha \cdot g \tag{5}$$

A method that extracts a green high-purity pixel value g' ($= I \cdot \phi_G$) is described below with reference to FIG. 3. The spectral characteristics $F_{G2}$ are obtained by multiplying the green spectral characteristics $F_G$ by a gain $\beta$ (coefficient $\beta$). The gain $\beta$ is calculated so that the spectral characteristics $F_{G2}$ include the regions $\phi_R$ and $\phi_B$ and the gain becomes a minimum. Note that the gain $\beta$ is calculated as described in detail later.

The gain of the green spectral characteristics $F_G$ is increased using the gain $\beta$ to obtain the spectral characteristics $F_{G2}$ (see the following expression (6)).

$$F_{G2} = \beta \cdot F_G,$$

$$1.0 < \beta \tag{6}$$

The region $\phi_G$ is calculated by the following expression (7) from the spectral characteristics $F_{G2}$ calculated using the expression (6) and the regions $\phi_R$, $\phi_{RB}$, and $\phi_B$ calculated using the expressions (1) and (3).

$$\phi_G = \beta \cdot F_G - (\phi_R + \phi_{RB} + \phi_B) \tag{7}$$

The high-purity pixel value g' is calculated using the following expression (8) in view of the expressions (1), (4), and (7).

$$g' = I \cdot \phi_G = \beta \cdot g - (r + \alpha \cdot g + b) \tag{8}$$

The high-purity primary-color pixel values $\{r', g', b'\} = \{I \cdot \phi_{B3}, I \cdot \phi_G, I \cdot \phi_R\}$ are thus obtained.

Note that an image acquired by an image sensor designed so that the RGB characteristics overlap each other to a certain extent can be used directly as the high-sensitivity image. Therefore, the pixel values r, g, and b can be used for the high-sensitivity image.

2.2. Coefficient ($\alpha$, $\beta$) Calculation Method

The coefficients $\alpha$ and $\beta$ are calculated (estimated) as described below. The coefficients $\alpha$ and $\beta$ calculated as described below may be stored in the image processing device 100, or the image processing device 100 may acquire the spectral characteristics $F_B$, $F_G$, and $F_R$, and calculate the coefficients $\alpha$ and $\beta$ based on the spectral characteristics $F_B$, $F_G$, and $F_R$.

Figure 4:
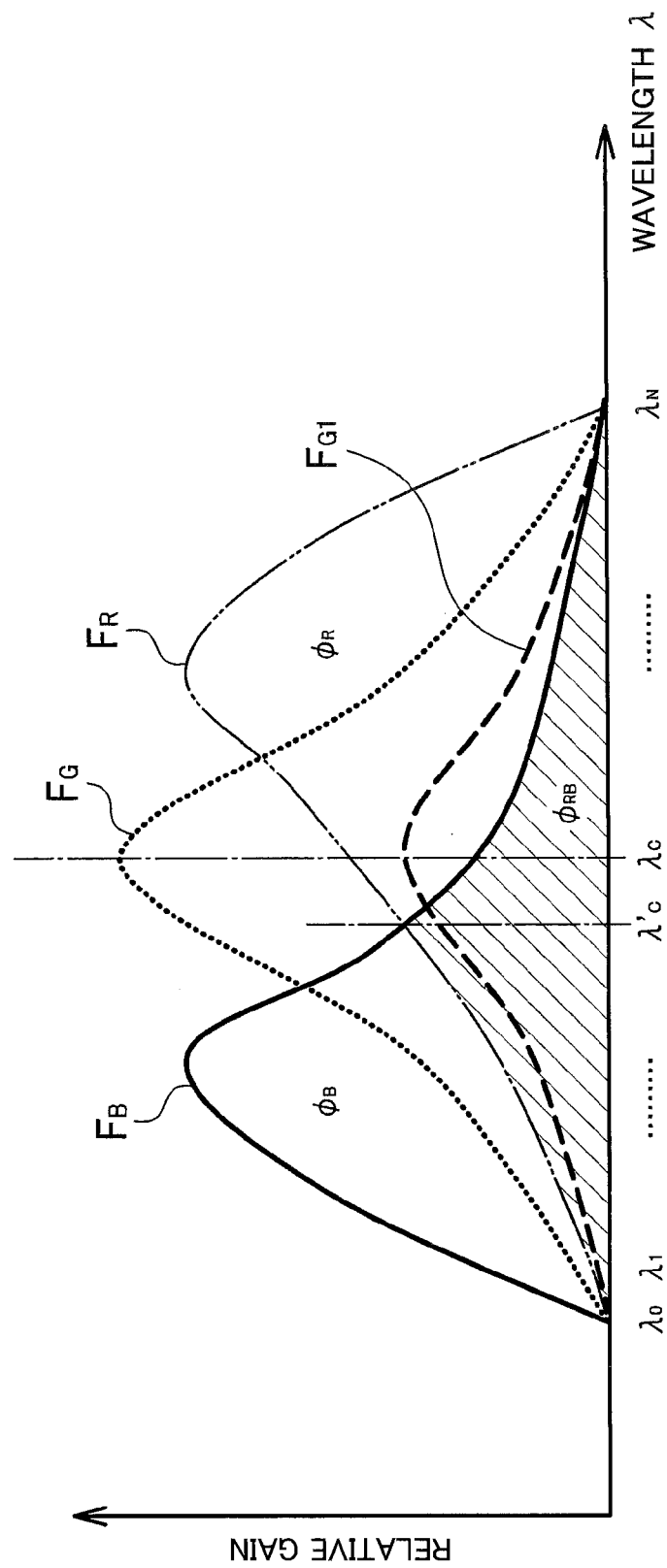
FIG. 4 is a view illustrating a method that calculates a coefficient $\alpha$.

As illustrated in FIG. 4, the spectral characteristics $F_B$ and $F_R$ are not necessarily symmetrical with respect to the spectral characteristics $F_G$. The coefficients $\alpha$ and $\beta$ are determined as described below when the spectral characteristics $F_B$ and $F_R$ are not symmetrical with respect to the spectral characteristics $F_G$.

The coefficient $\alpha$ is calculated as described below. The overlapping region $\phi_{RB}$ of the spectral characteristics $F_B$ and the spectral characteristics $F_R$ is biased with respect to the spectral characteristics $F_G$. The wavelength that corresponds to the maximum value of the spectral characteristics $F_G$ is referred to as $\lambda_C$, and the wavelength that corresponds to the cross point of the spectral characteristics $F_B$ and the spectral characteristics $F_R$ is referred to as $\lambda'_C$. The spectral characteristics of the overlapping region $\phi_{RB}$ and the spectral characteristics $F_G$ are respectively considered to be a vector $V_{RB}$ and a vector $V_G$ that include transmittance components that respectively correspond to a wavelength $\lambda_0$, a wavelength $\lambda_1$, a wavelength $\lambda_2$, ..., and a wavelength $\lambda_N$ (see the following expression (9)).

$$V_{RB} = [\phi_{RB}(\lambda_0), \phi_{RB}(\lambda_1), \phi_{RB}(\lambda_2), \ldots, \phi_{RB}(\lambda_N)],$$

$$V_G = [F_G(\lambda_0), F_G(\lambda_1), F_G(\lambda_2), \ldots, F_G(\lambda_N)] \tag{9}$$

The coefficient $\alpha$ that minimizes the Euclidean distance between the vector $V_{RB}$ and the vector $V_G$ is used (see the following expression (10)). This makes it possible to improve the similarity between the overlapping region $\phi_{RB}$ and the spectral characteristics $\alpha F_G (= F_{G1})$, and optimize the effect of reducing a leakage light component.

$$\alpha = \min\{\sqrt{(V_{RB} - \alpha V_G)^2}\} \tag{10}$$

Note that the coefficient $\alpha$ may be calculated using another method. For example, the regions $\phi_R$ and $\phi_B$ may be calculated using the expressions (1) and (3) while changing the coefficient α as a variable, the pixel values r' and b' may be calculated using the expression (5) on the assumption that the light intensity I is the intensity of white light having flat spectral characteristics, and the coefficient α may be calculated (searched) so that the white balance is optimized.

Figure 5:
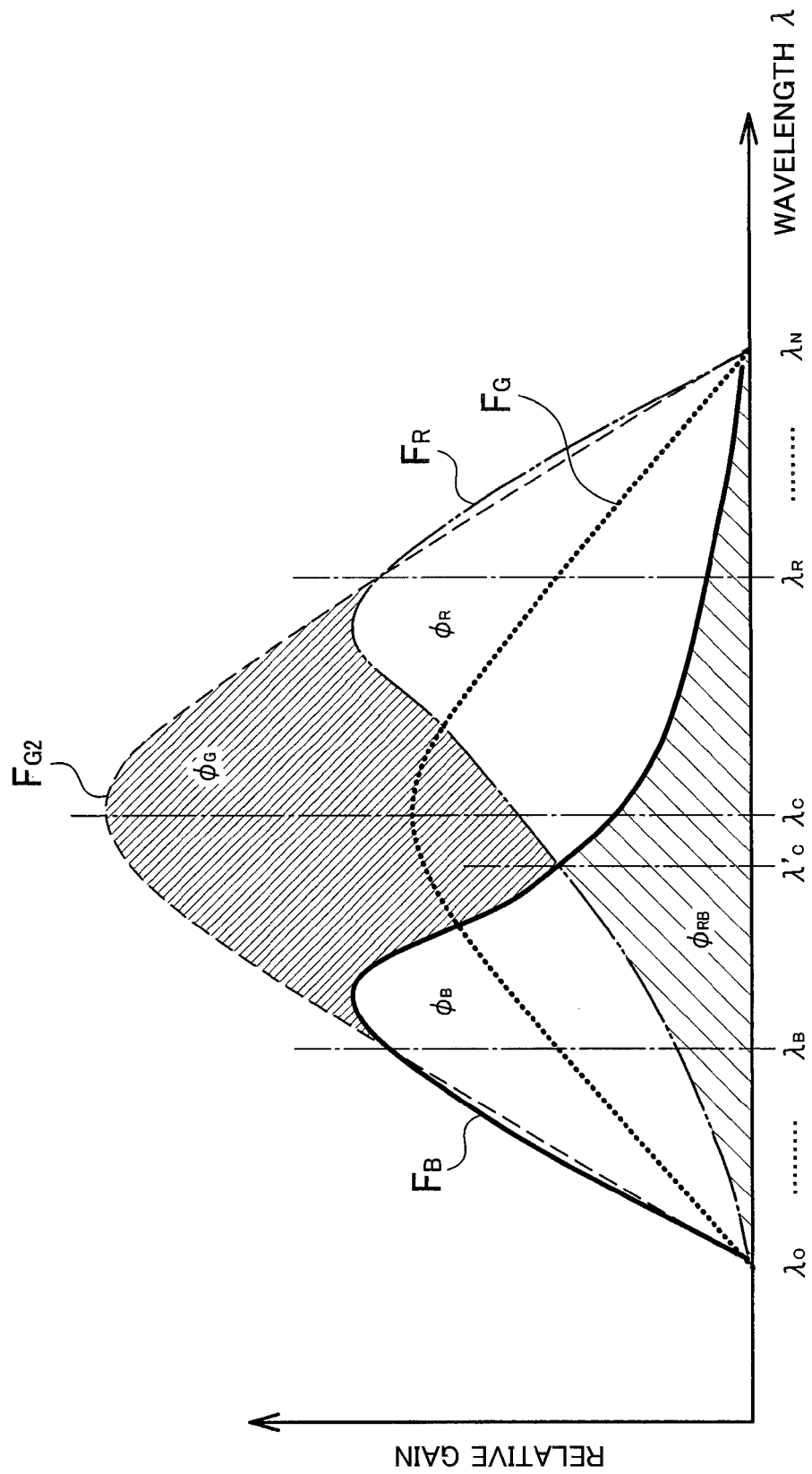
FIG. 5 is a view illustrating a method that calculates a coefficient $\beta$.

The coefficient β is calculated as described below. As illustrated in FIG. 5, a region obtained by subtracting the regions $\phi_R$, $\phi_{RB}$, and $\phi_B$ from the spectral characteristics $F_{G2}$ obtained by increasing the gain of the spectral characteristics $F_G$ so as to include regions $\phi_R$ and $\phi_B$ is referred to as a region $\phi_G$. The wavelength band within which the spectral characteristics $F_R$ and the spectral characteristics $F_{G2}$ almost coincide with each other includes a wavelength $\lambda_R$, a wavelength $\lambda_{R+1}, \ldots$, and a wavelength $\lambda_N$, and the wavelength band within which the spectral characteristics $F_B$ and the spectral characteristics $F_{G2}$ almost coincide with each other includes a wavelength $\lambda_0$, a wavelength $\lambda_1, \ldots$, and a wavelength $\lambda_B$. The spectral characteristics $F_R$ and the spectral characteristics $F_{G2}$ are respectively considered to be a vector $V_R$ and a vector $V_{GR2}$ that include transmittance components that respectively correspond to a wavelength $\lambda_R$, a wavelength $\lambda_{R+1}, \ldots$, and a wavelength $\lambda_N$ (see the following expression (11)). The spectral characteristics $F_B$ and the spectral characteristics $F_{G2}$ are respectively considered to be a vector $V_B$ and a vector $V_{GB2}$ that include transmittance components that respectively correspond to a wavelength $\lambda_0$, a wavelength $\lambda_1, \ldots$, and a wavelength $\lambda_B$.

$$V_R = [F_R(\lambda_R), F_R(\lambda_{R+1}), \ldots, F_R(\lambda_N)],$$

$$V_{GR2} = [F_{G2}(\lambda_R), F_{G2}(\lambda_{R+1}), \ldots, F_{G2}(\lambda_N)],$$

$$V_B = [F_B(\lambda_0), F_B(\lambda_1), \ldots, F_B(\lambda_B)],$$

$$V_{GB2} = [F_{G2}(\lambda_0), F_{G2}(\lambda_1), \ldots, F_{G2}(\lambda_B)] \quad (11)$$

The coefficient β that minimizes the Euclidean distance between the vector $V_R$ and the vector $V_{GR2}$ and the Euclidean distance between the vector $V_B$ and the vector $V_{GB2}$ is used (see the following expression (12)). This makes it possible to improve the similarity between the regions $\phi_R$ and $\phi_B$ and the spectral characteristics $\beta F_G$ ($=F_{G2}$), and optimize the effect of reducing a leakage light component.

$$\beta = \min\{\sqrt{(V_B - \beta V_{GB2})^2} + \sqrt{(V_R - \beta V_{GR2})^2}\} \quad (12)$$

Note that the coefficient β may be calculated using another method. For example, the regions $\phi_R$, $\phi_{RB}$, and $\phi_B$ may be calculated using the expressions (1) and (3) while changing the coefficient β as a variable, the pixel values r', g', and b' may be calculated using the expression (5) on the assumption that the light intensity I is the intensity of white light having flat spectral characteristics, and the coefficient β may be calculated (searched) so that the white balance is optimized.

Although an example in which the spectral characteristics $F_B$, $F_G$, and $F_R$ are the spectral characteristics of the color filters of the image sensor has been described above, the spectral characteristics $F_B$, $F_G$, and $F_R$ may include the spectral characteristics of the imaging optical system, the sensitivity characteristics of the pixels of the image sensor, the spectral characteristics of a light source, and the like. In this case, the spectral characteristics $F_B$, $F_G$, and $F_R$ are determined corresponding to illumination and the imaging conditions using the image sensor, and the coefficients α and β may be calculated in advance. When an image is captured using external light or the like, the spectral characteristics $F_B$, $F_G$, and $F_R$ may be detected each time an image is captured, and the coefficients α and β may be calculated from the detected spectral characteristics.

2.3. Imaging Device

Figure 6:
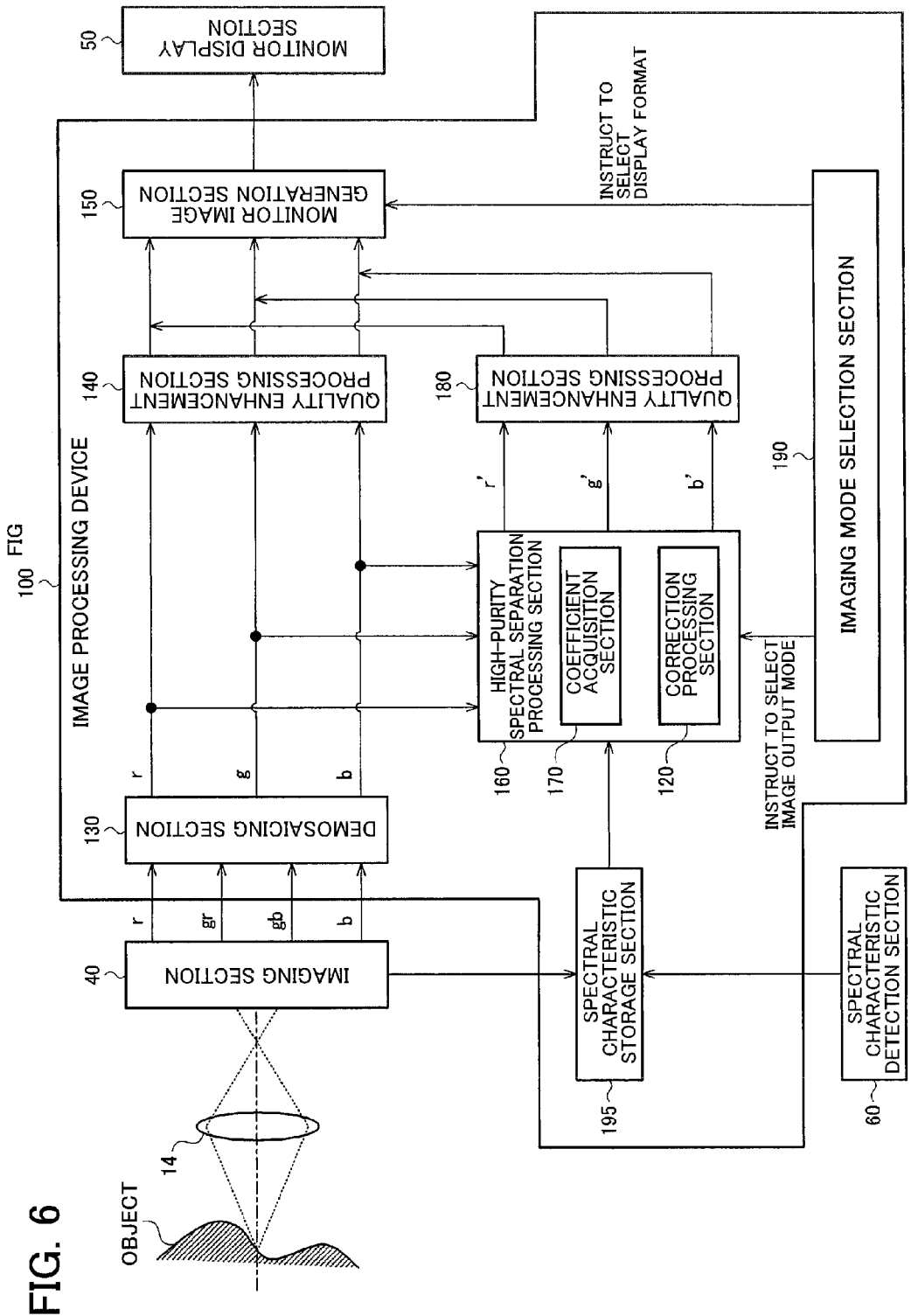
FIG. 6 illustrates a configuration example of an imaging device (first embodiment).

FIG. 6 illustrates a configuration example of an imaging device that simultaneously acquires the high-sensitivity image {r, g, b} and the high-color-reproduction image {r', g', b'}.

The imaging device includes an imaging lens 14 (optical system), an imaging section 40, a monitor display section 50, a spectral characteristic detection section 60, and the image processing device 100. The image processing device 100 includes a demosaicing section 130, a quality enhancement processing section 140, a monitor image generation section 150, a high-purity spectral separation processing section 160, a quality enhancement processing section 180, an imaging mode selection section 190, and a spectral characteristic storage section 195.

The imaging section 40 includes the image sensor 20 and an imaging processing section. The image sensor 20 is a color image sensor that includes a Bayer array, for example. The imaging processing section performs an imaging operation control process, an analog pixel signal A/D conversion process, and the like, and outputs a Bayer-array image {r, gr, gb, b}.

The demosaicing section 130 performs a demosaicing process on the Bayer-array image to generate an image (RGB image) {r, g, b} that has RGB pixel values on a pixel basis.

Note that the image acquisition section 110 illustrated in FIG. 1 corresponds to the imaging processing section or the demosaicing section 130. Specifically, the image acquisition process is a process that causes the imaging processing section to acquire a digital image from the output of the image sensor, or a process that causes the demosaicing section 130 to acquire an RGB image from the Bayer image.

Since the color image sensor is designed so that the RGB characteristics $F_B$, $F_G$, and $F_R$ overlap each other to a certain extent, the image {r, g, b} can be used directly as the high-sensitivity image. Note that an image sensor having normal overlapping characteristics may be used as the color image sensor, or an image sensor having higher overlapping characteristics may be used as the color image sensor. In the latter case, each color band can be widened, and an image can be captured with higher sensitivity.

For example, a bright image can be captured in a dark place.

The quality enhancement processing section 140 performs a quality enhancement process (e.g., noise reduction process and grayscale correction process) on the high-sensitivity image {r, g, b}, and outputs the resulting image to the monitor image generation section 150. The monitor image generation section 150 displays the image on the monitor display section 50.

The high-purity spectral separation processing section 160 includes a coefficient acquisition section 170 that acquires the coefficient α and β, and a correction processing section 120 that extracts high-purity primary-color components from the RGB image {r, g, b} generated by the demosaicing process.

The spectral characteristic storage section 195 stores the spectral characteristics {$F_B$, $F_G$, $F_R$} of the color filters. The spectral characteristics may be acquired from the imaging section 40, or may be stored in the spectral characteristic storage section 195 in advance, for example. The spectral characteristic detection section 60 that acquires the spectral characteristics of external light or illumination light may be further provided, and the spectral characteristics {$F_B$, $F_G$, $F_R$} may be acquired together with the spectral characteristics of external light or illumination light.

The coefficient acquisition section 170 reads the spectral characteristics {$F_B$, $F_G$, $F_R$} from the spectral characteristic storage section 195, and calculates the coefficients α and β as described above based on the spectral characteristics {$F_B$, $F_G$, $F_R$}

Alternatively, the coefficients α and β calculated in advance from the spectral characteristics {$F_B$, $F_G$, $F_R$} may be stored in the spectral characteristic storage section 195. In this case, the coefficient acquisition section 170 acquires the coefficients α and β by reading the coefficients α and β from the spectral characteristic storage section 195.

The correction processing section 120 calculates the high-color-reproduction image {r', g', b'} based on the coefficients α and β by performing a process based on the above method, and outputs the high-color-reproduction image.

The quality enhancement processing section 180 performs an adjustment process (e.g., color balance adjustment process) on the high-color-reproduction image {r', g', b'} in order to improve color reproducibility. Specifically, the quality enhancement processing section 180 performs an appropriate quality enhancement process (e.g., white balance process) on the high-color-reproduction image {r', g', b'}. The quality enhancement processing section 180 outputs the resulting image to the monitor image generation section 150, and the monitor image generation section 150 displays the image on the monitor display section 50.

The imaging mode selection section 190 selects the monitor display image. Specifically, the imaging mode selection section 190 instructs the monitor image generation section 150 to display the high-sensitivity image or the high-color-reproduction image (that has been selected) on the monitor. The imaging mode selection section 190 may instruct the monitor image generation section 150 to display both the high-sensitivity image and the high-color-reproduction image on the monitor. The image may be selected based on an instruction that has been input by the user through an operation section (not illustrated in the drawings), for example. Alternatively, an external light sensor may be provided, and the image may be selected based on the brightness detected by the external light sensor. For example, the high-color-reproduction image may be selected when the brightness of external light is higher than a threshold value, and the high-sensitivity image may be selected when the brightness of external light is lower than the threshold value.

Although an example in which the image processing device 100 is included in the imaging device has been described above, the image processing device 100 may be provided separately from the imaging device. In this case, the imaging device (that is provided separately from the image processing device 100) records captured image data and data that represents the spectral characteristics {$F_B$, $F_G$, $F_R$} in a recording device (not illustrated in the drawings). The image processing device 100 acquires the recorded data, and calculates the high-color-reproduction image {r', g', b'} from the acquired data. Specifically, the image processing device 100 may calculate the high-color-reproduction image by performing a post-capture process. When the image processing device 100 is provided separately from the imaging device, the image processing device 100 may be an information processing device such as a PC, for example.

According to the above imaging system, it is possible to select the high-sensitivity image when it is desired to give priority to sensitivity in a dark environment, and select the high-color-reproduction image when it is desired to give priority to color reproducibility in a bright environment. It is possible to capture two images in real time, and implement a reduction in the amount of data and an imaging process that flexibly deals with the objective as compared with a known method that captures images a plurality of times while changing the conditions. According to the first embodiment, since the process basically depends on the characteristics of the color filters of the image sensor, it is unnecessary to provide an optical filter that extracts high-purity primary-color pixel values, and a mechanism that mechanically inserts and removes an optical filter. Therefore, the imaging system can be easily implemented, and is absolutely feasible.

According to the first embodiment, the second color (green) is a color that is longer in wavelength than the first color (blue) and is shorter in wavelength than the third color (red) (see FIG. 2). The correction processing section 120 multiplies the pixel value g that corresponds to the second color by the first coefficient α based on the first transmittance characteristics $F_B$ and the third transmittance characteristics $F_R$ to calculate the component value $I \cdot \phi_{RB} \approx \alpha \cdot g$ that corresponds to the overlapping region (see the expressions (1) to (5)).

A normal image sensor is designed so that the overlapping region $\phi_{RB}$ of the spectral characteristics $F_B$ of the color filter that corresponds to the first color (blue) and the spectral characteristics $F_R$ of the color filter that corresponds to the third color (red) is similar to the spectral characteristics $F_G$ of the color filter that corresponds to the second color (green) (see above). According to the first embodiment, since it is possible to separate the high-color-purity image, spectral characteristics differing from those of a normal image sensor may also be employed. In this case, the similarity between the overlapping region $\phi_{RB}$ and the spectral characteristics $F_G$ may be increased. It is possible to estimate the component value $I \cdot \phi_{RB}$ that corresponds to the overlapping region to be $\alpha \cdot g$ based on the similarity between the overlapping region $\phi_{RB}$ and the spectral characteristics $F_G$, and perform the correction process that increases the color purity of the pixel value b that corresponds to the first color, the pixel value g that corresponds to the second color, and the pixel value r that corresponds to the third color based on the estimated value.

According to the first embodiment, the coefficient acquisition section 170 acquires the first coefficient α that maximizes the similarity between the second transmittance characteristics $F_G$ multiplied by the first coefficient α and the overlapping region $\phi_{RB}$ (see the expressions (9) and (10)).

This makes it possible to determine the coefficient α that maximizes the similarity between the second transmittance characteristics $F_G$ and the overlapping region $\phi_{RB}$ based on the similarity between the second transmittance characteristics $F_G$ and the overlapping region $\phi_{RB}$. Therefore, it is possible to improve the accuracy of the correction process that increases the color purity (i.e., the correction process that subtracts the component $\alpha \cdot g$ that corresponds to the overlapping region from the pixel values r and b).

According to the first embodiment, the first coefficient α that maximizes the similarity is the first coefficient α that minimizes the Euclidean distance between the vector $V_{RB}$ and the vector $V_G$, the vector $V_{RB}$ corresponding to the overlapping region $\phi_{RB}$, and including the transmittance components that respectively correspond to a plurality of wavelengths ($\lambda_0$, $\lambda_1$, . . . , and $\lambda_N$), and the vector $V_G$ corresponding to the second transmittance characteristics $F_G$ multiplied by the first coefficient α, and including the transmittance components that respectively correspond to a plurality of wavelengths ($\lambda_0, \lambda_1, \ldots,$ and $\lambda_N$) (see the expressions (9) and (10)).

This makes it possible to calculate the similarity using the Euclidean distance between the vector $V_{RB}$ and the vector $V_G$ as an index. The first coefficient $\alpha$ is determined on the assumption that the similarity becomes a maximum when the index becomes a minimum.

According to the first embodiment, the correction processing section 120 corrects the pixel value b that corresponds to the first color by subtracting the component value $\alpha \cdot g$ that corresponds to the overlapping region $\phi_{RB}$ from the pixel value b that corresponds to the first color (pixel value b'), and corrects the pixel value r that corresponds to the third color by subtracting the component value $\alpha \cdot g$ that corresponds to the overlapping region $\phi_{RB}$ from the pixel value r that corresponds to the third color (pixel value r') (see the expressions (1) to (5)).

This makes it possible to reduce the component value $1 \cdot \phi_{RB}$ that corresponds to the overlapping region $\phi_{RB}$ from the pixel value b that corresponds to the first color and the pixel value r that corresponds to the third color using the component value $\alpha \cdot g$ that corresponds to the overlapping region $\phi_{RB}$ estimated using the first coefficient. Therefore, it is possible to calculate the pixel values b and r having high color purity from the captured image for which the spectral characteristics of the color filters overlap each other.

According to the first embodiment, the correction processing section 120 corrects the pixel value g that corresponds to the second color by subtracting the component value $\alpha \cdot g$ that corresponds to the overlapping region, the corrected pixel value b' that corresponds to the first color, and the corrected pixel value r' that corresponds to the third color from the pixel value g that corresponds to the second color that is multiplied by the second coefficient t based on the first transmittance characteristics $F_B$ and the third transmittance characteristics $F_R$ (pixel value g') (see FIG. 5 and the expressions (6) and (7)).

This makes it possible to estimate the component value $\beta \cdot g$ of the spectral characteristics obtained by increasing the gain of the second transmittance characteristics $F_G$ using the second coefficient $\beta$, and calculate the pixel value g' that corresponds to the second color and has high color purity based on the estimated component value $\beta \cdot g$. Specifically, it is possible to perform the correction process that reduces (or cancels) the overlapping component of the pixel value b that corresponds to the first color and the pixel value r that corresponds to the second color from the component value $\beta \cdot g$.

According to the first embodiment, the coefficient acquisition section 170 acquires the second coefficient $\beta$ that maximizes the similarity of a short-wavelength-side part (i.e., a part that corresponds to a wavelength shorter than the wavelength $\lambda_B$) of the first transmittance characteristics $F_B$ and a long-wavelength-side part (i.e., a part that corresponds to a wavelength shorter than the wavelength $\lambda_R$) of the third transmittance characteristics $F_R$, with the second transmittance characteristics $F_G$ multiplied by the second coefficient $\beta$ (see FIG. 5) (see the expressions (11) and (12)).

This makes it possible to determine the coefficient $\beta$ that maximizes the similarity of the second transmittance characteristics $F_G$ with part of the first transmittance characteristics $F_B$ and part of the third transmittance characteristics $F_R$ based on the similarity of the second transmittance characteristics $F_G$ with part of the first transmittance characteristics $F_B$ and part of the third transmittance characteristics $F_R$. Therefore, it is possible to improve the accuracy of the correction process that increases the color purity (i.e., the correction process that subtracts the components r', b', and $\alpha \cdot g$ that correspond to the overlapping region from the component value $\beta \cdot g$).

According to the first embodiment, a given wavelength that is shorter than the wavelength that corresponds to the maximum transmittance represented by the first transmittance characteristics $F_B$ is referred to as a first wavelength $\lambda_B$, and a given wavelength that is longer than the wavelength that corresponds to the maximum transmittance represented by the third transmittance characteristics $F_R$ is referred to as a second wavelength $\lambda_R$ (see FIG. 5). A vector that corresponds to the first transmittance characteristics $F_B$, and includes the transmittance components that respectively correspond to a plurality of wavelengths ($\lambda_0, \lambda_1, \ldots,$ and $\lambda_B$) shorter than the first wavelength $\lambda_B$ is referred to as $V_B$. A vector that corresponds to the third transmittance characteristics $F_R$, and includes the transmittance components that respectively correspond to a plurality of wavelengths ($\lambda_R, \lambda_{R+1}, \ldots,$ and $\lambda_N$) longer than the second wavelength $\lambda_R$ is referred to as $V_R$. Vectors that correspond to the second transmittance characteristics $F_G$ multiplied by the second coefficient $\beta$, and include the transmittance components that respectively correspond to a plurality of wavelengths are referred to as $V_{GB2}$ and $V_{GR2}$ (see the expression (11)). In this case, the second coefficient $\beta$ that maximizes the similarity is the second coefficient $\beta$ that minimizes the Euclidean distance between the vector $V_B$ and the vector $V_{GB2}$ and the Euclidean distance between the vector $V_R$ and the vector $V_{GR2}$ (see the expression (12)).

This makes it possible to calculate the similarity using the Euclidean distance between the vector $V_B$ and the vector $V_{GB2}$ and the Euclidean distance between the vector $V_R$ and the vector $V_{GR2}$ as indices. The second coefficient $\beta$ is determined on the assumption that the similarity becomes a maximum when the indices become a minimum.

According to the first embodiment, a display control section (monitor image generation section 150) performs a control process that displays at least one of the high-sensitivity image (pixel values b, g, and r) and the high-color-reproduction image on a display section (monitor display section 50), the high-sensitivity image being an image acquired by the image acquisition section 110 (e.g., demosaicing section 130), and the high-color-reproduction image being an image based on the pixel value b that corresponds to the first color, the pixel value g that corresponds to the second color, and the pixel value r that corresponds to the third color that have been corrected by the correction processing section 120.

According to the first embodiment, it is possible to generate the high-color-reproduction image from the high-sensitivity image. Specifically, the high-sensitivity image and the high-color-reproduction image can be simultaneously acquired from a single captured image. The display control section can select one of the high-sensitivity image and the high-color-reproduction image that have been simultaneously acquired, and display the selected image on the display section, or simultaneously display both the high-sensitivity image and the high-color-reproduction image on the display section.

According to the first embodiment, a selection section (imaging mode selection section 190) acquires external brightness information, and selects one of the high-sensitivity image and the high-color-reproduction image based on the external brightness information. The display control section (monitor image generation section 150) performs the control process that displays the image selected by the selection section.

This makes it possible to selectively display the high-sensitivity image and the high-color-reproduction image corresponding to the external brightness. Specifically, it is possible to display the high-sensitivity image (for which the spectral characteristics overlap each other) in a dark environment, and display the high-color-reproduction image (for which the overlapping component is reduced or deleted) in a bright environment.

3. Second Embodiment

A second embodiment of the invention is described below. An imaging device according to the second embodiment may be configured in the same manner as the imaging device illustrated in FIGS. 1 and 6.

In the second embodiment, the spectral characteristics of the regions $\{\phi_R, \phi_{RB}, \phi_B\}$ are estimated based on a relational expression. Specifically, the pixel values $\{I \cdot \phi_R, I \cdot \phi_{RB}, I \cdot \phi_B\} = \{r', gx, b'\}$ that correspond to the regions $\{\phi_R, \phi_{RB}, \phi_B\}$ and the primary-color pixel values $\{r, g, b\}$ obtained by the demosaicing process satisfy the relationship represented by the following expression (13). Note that the case where $I \cdot \phi_{RB} = gx$ is described below for convenience of explanation.

$$r = I \cdot F_R = I \cdot (\phi_R + \phi_{RB}) = r' + gx,$$

$$b = I \cdot F_B = I \cdot (\phi_B + \phi_{RB}) = b' + gx \quad (13)$$

The relational expression represented by the following expression (14) is obtained (see the expression (13)) provided that $I \cdot \phi_{RB} = gx$ is an unknown (unknown variable).

$$gx = (\text{unknown}),$$

$$r' = r - gx,$$

$$b' = b - gx \quad (14)$$

The expression (14) represents that the pixel values $\{r', b'\}$ are uniquely determined when the unknown gx has been determined. When the value gx is correct, the pixel values $\{r', b'\}$ can be calculated as correct values.

However, there are a number of solutions in this stage with respect to the candidate values $\{r', gx, b'\}$. In order to determine the maximum likelihood solution from a number of solutions, reference values $\{I_R, I_{RB}, I_B\}$ that exist in the vicinity of the candidate values $\{r', gx, b'\}$ are calculated. The occupancy ratio of the region $\phi_R$ with respect to the spectral characteristics $F_R$ is referred to as $\gamma_R$, the occupancy ratio of the region $\phi_B$ with respect to the spectral characteristics $F_B$ is referred to as $\gamma_B$, and the reference values are represented by the following expression (15). Note that a is a coefficient that is calculated as described above in connection with the first embodiment.

$$I_R = I \cdot \phi_R = I \cdot (\gamma_R \cdot F_R) = \gamma_R \cdot r,$$

$$I_{RB} = I \cdot \phi_{RB} = I \cdot (\alpha \cdot F_G) = \alpha \cdot g,$$

$$I_B = I \cdot \phi_B = I \cdot (\gamma_B \cdot F_B) = \gamma_B \cdot b \quad (15)$$

In order to determine the maximum likelihood solution with respect to the reference values $\{I_R, I_{RB}, I_B\}$ from the candidate values $\{r', gx, b'\}$, the candidate values $\{r', gx, b'\}$ that minimize an error therebetween is calculated.

Figure 7:
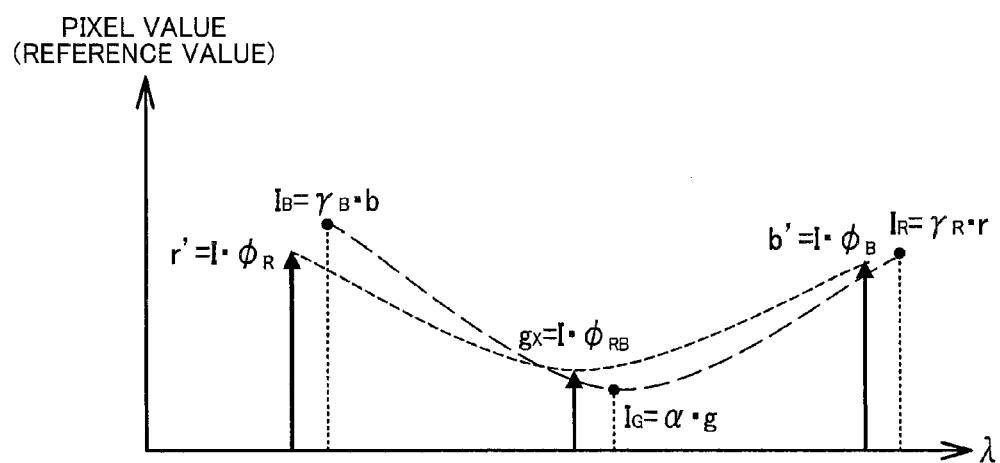
FIG. 7 is a view illustrating a method that calculates a high-color-reproduction image (second embodiment).

The spectral characteristics $\{F_R, F_G, F_B\}$ are determined by the imaging conditions, and the coefficient $\alpha$, the occupancy ratio $\gamma_R$, and the occupancy ratio $\gamma_B$ are known information. Therefore, the spectral characteristics $\{F_R, F_G, F_B\}$, the coefficient $\alpha$, the occupancy ratio $\gamma_R$, and the occupancy ratio $\gamma_B$ are substituted into the expression (15) to calculate the reference values $\{I_R, I_{RB}, I_B\}$. The reference values and the expression (14) are substituted into the following expression (16) (evaluation function E(gx)) to calculate the unknown gx that minimizes the evaluation function E(gx). Specifically, the unknown gx that minimizes an error between the candidate values $\{r', gx, b'\}$ (calculated using the unknown gx) and the reference values $\{I_R, I_{RB}, I_B\}$ is determined (see FIG. 7).

$$E(gx) = (r' - I_R)^2 + (gx - I_{RB})^2 + (b' - I_B)^2 \quad (16)$$

The unknown gx that minimizes the evaluation function E(gx) may be calculated (searched) using the expression (16) while changing the unknown gx, or the expression (16) may be expanded as a quadratic function of the unknown gx, and analytically solved to determine the unknown gx. Note that the ranges of the candidate values $\{r', gx, b'\}$ are limited as represented by the following expression (17). Therefore, the unknown gx is determined so that the conditions represented by the following expression (17) are satisfied.

$$0 \leq r' < (\text{maximum preset pixel value})$$

$$0 \leq gx < (\text{maximum preset pixel value})$$

$$0 \leq b' < (\text{maximum preset pixel value}) \quad (17)$$

According to the second embodiment, the correction processing section 120 calculates the evaluation value E(gx) that represents the similarity of the candidate value for the component value $gx = I \cdot \phi_{RB}$ that corresponds to the overlapping region $\phi_{RB}$, the value $b' = b - gx$ obtained by correcting the pixel value b that corresponds to the first color (blue) using the candidate value gx, and the value $r' = r - gx$ obtained by correcting the pixel value r that corresponds to the third color (red) using the candidate value gx, with the pixel value b that corresponds to the first color, the pixel value g that corresponds to the second color, and the pixel value r that corresponds to the third color (see the expressions (13) to (16)). The correction processing section 120 calculates the component value $gx = I \cdot \phi_{RB}$ that corresponds to the overlapping region $\phi_{RB}$ by determining the candidate value gx that maximizes the similarity based on the evaluation value E(gx) (see FIG. 7).

This makes it possible to calculate the corrected pixel values $\{r', g', b'\}$ based on the similarity of the candidate values $\{r', gx, b'\}$ for the corrected pixel values with the pixel value b that corresponds to the first color, the pixel value g that corresponds to the second color, and the pixel value r that corresponds to the third color. Specifically, the evaluation value E(gx) is calculated as a similarity index, and the component value gx that corresponds to the overlapping region $\phi_{RB}$ is determined on the assumption that the similarity becomes a maximum when the evaluation value E(gx) becomes a minimum, for example. When the component value gx that corresponds to the overlapping region $\phi_{RB}$ has been determined (calculated), the high-color-purity pixel values $\{r', g', b'\}$ can be calculated in the same manner as described above in connection with the first embodiment.

4. Third Embodiment

4.1. Method that Reduces Leakage Light Between Right-Pupil Image and Left-Pupil Image A third embodiment of the invention is described below. In the third embodiment, a phase difference detection process is performed using the right pupil and the left pupil to reduce leakage light between the right-pupil image and the left-pupil image.

Although an example that divides the pupil of a monocular optical system is described below, the configuration is not limited thereto. For example, a twin-lens optical system may be used to provide two pupils. Although an example in which the first pupil is the right pupil and the second pupil is the left pupil is described below, the configuration is not limited thereto. Specifically, the pupil need not necessarily be divided into the right pupil and the left pupil. It suffices that the pupil be divided into the first pupil and the second pupil along an arbitrary direction that is perpendicular to the optical axis of the imaging optical system.

Figure 8:
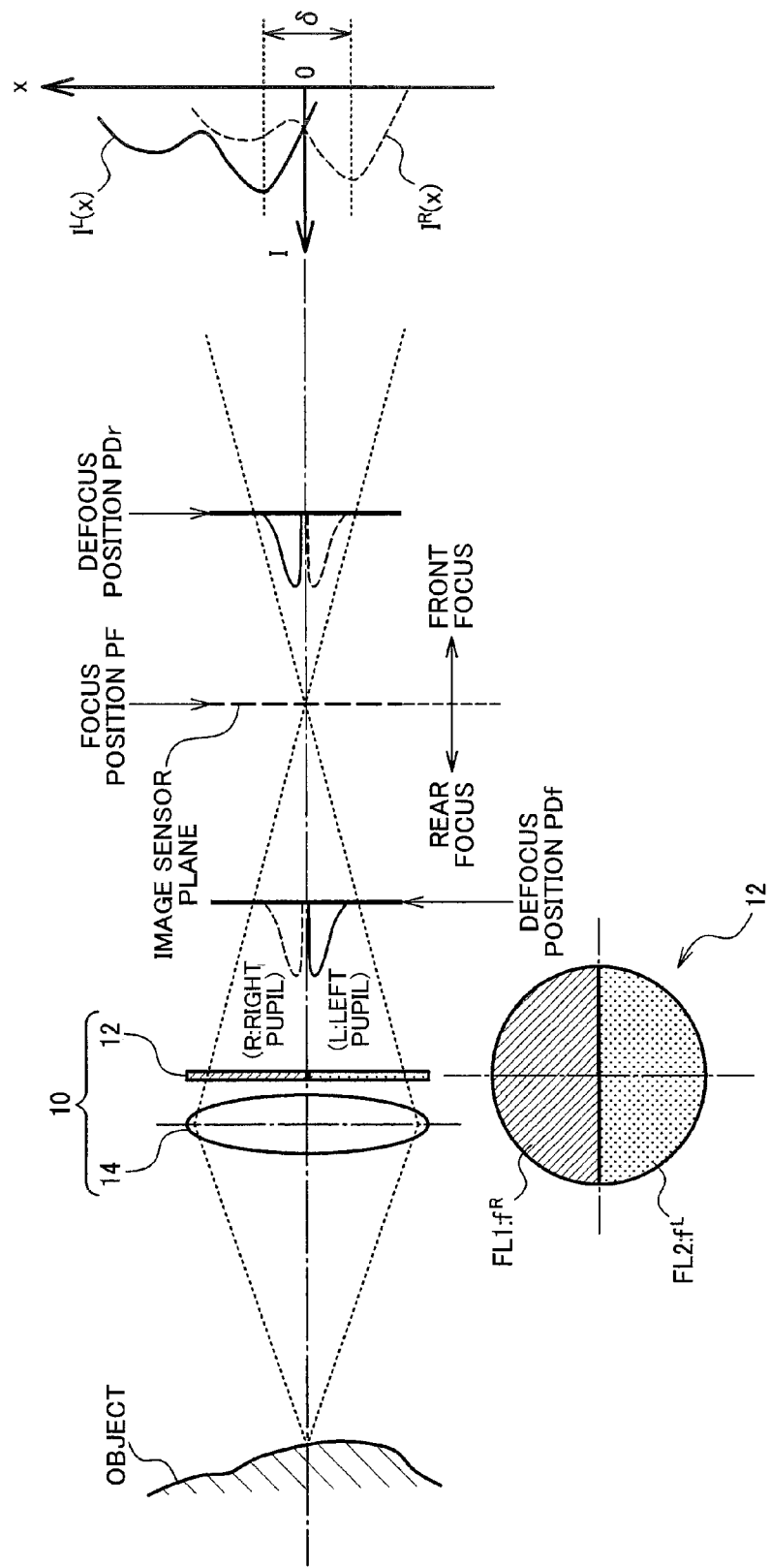
FIG. 8 illustrates a basic configuration example of an imaging device (third embodiment).

FIG. 8 illustrates a basic configuration example of an imaging device according to the third embodiment. The imaging device includes an optical system 10 that forms an image of the object on an image sensor. The optical system 10 includes an imaging lens 14 and an optical filter 12.

The optical filter 12 includes a right-pupil filter FL1 (first filter) that has transmittance characteristics $f^R$, and a left-pupil filter FL2 (second filter) that has transmittance characteristics $f^L$. The optical filter 12 is provided at the pupil position (e.g., a position where the aperture is provided) of the imaging optical system 10. The filter FL1 corresponds to the right pupil, and the filter FL2 corresponds to the left pupil. When the light intensity of light incident on the image sensor is referred to as I, $I^R(x)=I(x)\cdot f^R$, $I^L(x)=I(x)\cdot f^L$, and $I(x)=I^R(x)+I^L(x)$. Note that x is the position (coordinates) in the horizontal direction (pupil division direction).

Figure 9:
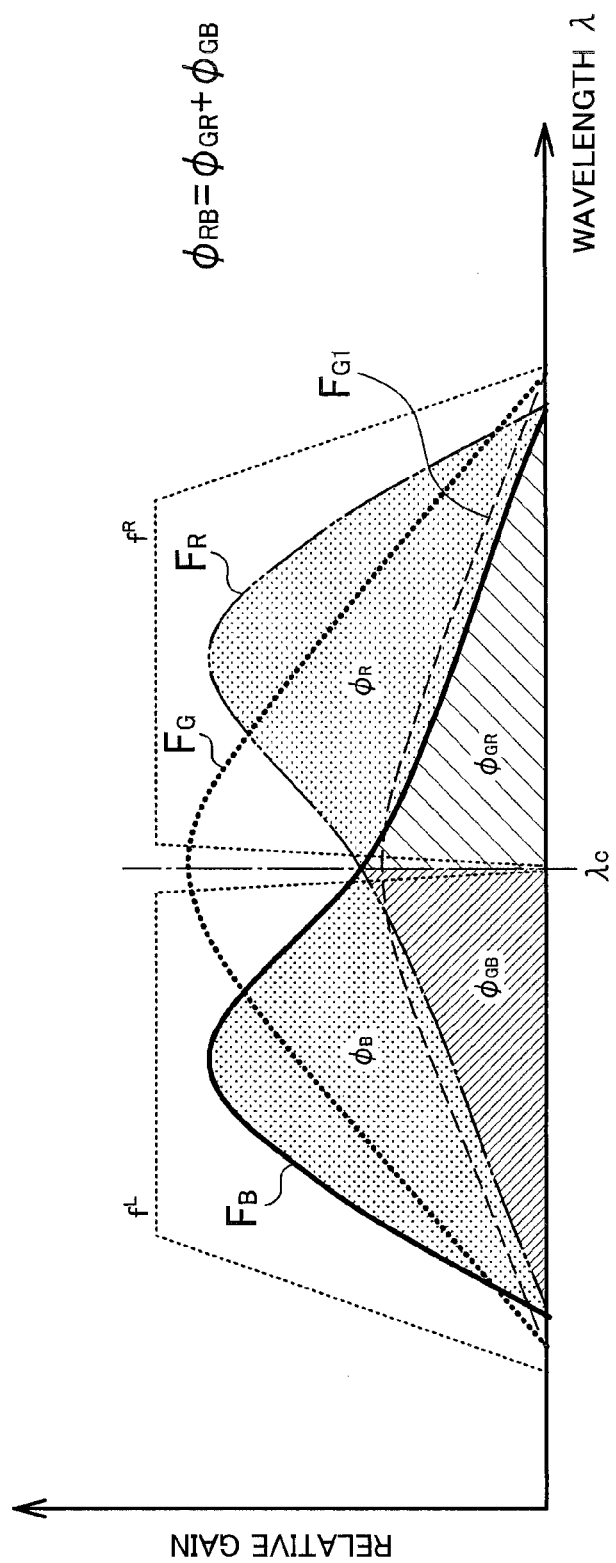
FIG. 9 is a view illustrating a method that separates an image into a right-pupil image and a left-pupil image.

The transmittance characteristics $\{f^R, f^L\}$ are obtained by dividing the imaging wavelength band into two spectral (band) components. As illustrated in FIG. 9, the transmittance characteristics $\{f^R, f^L\}$ are obtained by dividing the band that includes (covers) RGB spectral characteristics $\{F_R, F_G, F_B\}$ into two spectral (band) components. For example, the band is divided at the wavelength $\lambda_C$ at which the spectral characteristics $F_R$ and the spectral characteristics $F_B$ cross each other. Alternatively, the band is divided at a wavelength that is set so as to increase the degree of separation between the right-pupil image and the left-pupil image.

The image captured by the image sensor is obtained as the component values obtained by multiplying the incident light intensity I by the RGB spectral characteristics $\{F_R, F_G, F_B\}$ (see FIG. 9). The spectral characteristics $\{F_R, F_G, F_B\}$ are composite spectral characteristics of the spectral characteristics of the color filter provided at each pixel of the image sensor, and the spectral characteristics of external light or illumination light applied to the object.

The spectral characteristics $\{F_R, F_G, F_B\}$ are divided into four regions. The overlapping region of the spectral characteristics $F_R$ and the transmittance characteristics $f^R$ is referred to as $\phi_{GR}$, and the overlapping region of the spectral characteristics $F_B$ and the transmittance characteristics $f^L$ is referred to as $\phi_{GB}$. A region obtained by subtracting the overlapping component $\phi_{RB}$ ($=\phi_{GR}+\phi_{GB}$) from the spectral characteristics $F_R$ is referred to as $\phi_R$, and a region obtained by subtracting the overlapping component $\phi_{RB}$ ($=\phi_{GR}+\phi_{GB}$) from the spectral characteristics $F_B$ is referred to as $\phi_B$.

It is necessary to accurately separate the right-pupil image and the left-pupil image in order to accurately detect phase difference information. Since separate bands $\{f^R, f^L\}$ are assigned to the right pupil and the left pupil, it is possible to separate the right-pupil image and the left-pupil image when the right-pupil image is formed by the pixel value $r=I\cdot F_R$, and the left-pupil image is formed by the pixel value $b=I\cdot F_B$, for example.

However, since the filter characteristics of the image sensor are not completely separated into the bands $\{f^R, f^L\}$ assigned to the right pupil and the left pupil, the pupil image component is mixed as leakage light, and acquired. Specifically, the pixel value $r=I\cdot F_R$ of the right-pupil image includes the component $\phi_{GB}$ that overlaps the spectral characteristics $f^L$ of the left pupil, and the pixel value $b=I\cdot F_B$ of the left-pupil image includes the component $\phi_{GR}$ that overlaps the spectral characteristics $f^R$ of the right pupil. The right-pupil image and the left-pupil image are mixed in this manner, and the degree of separation decreases.

Figure 10:
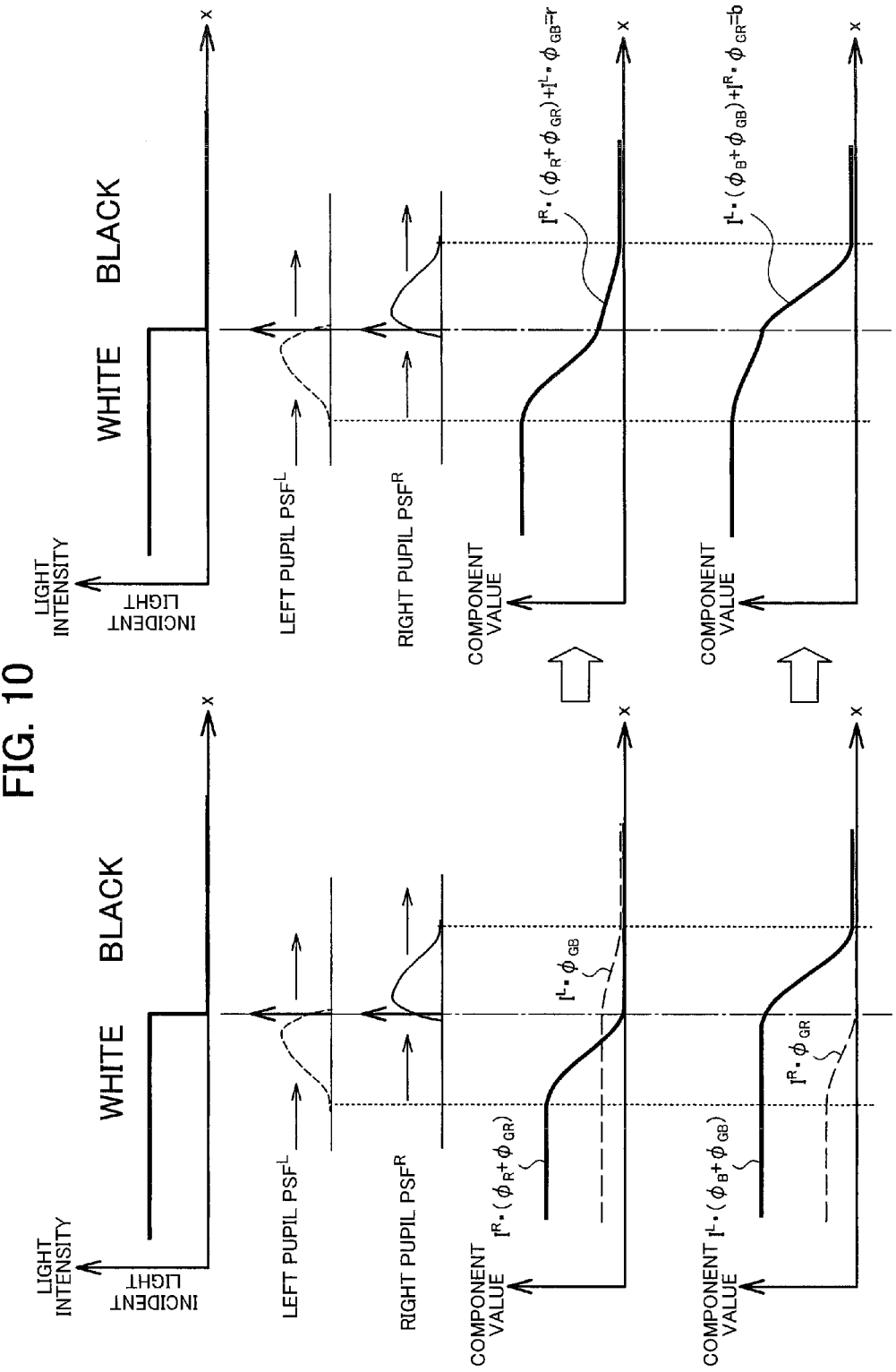
FIG. 10 is a view illustrating the profile of a right-pupil image and the profile of a left-pupil image.

The phase difference detection accuracy deteriorates due to a decrease in the degree of separation. For example, when the image pattern is a pattern in which the color of the object changes from white to black (see FIG. 10), the profile of the right-pupil image and the profile of the left-pupil image are distorted, and the similarity between the right-pupil image and the left-pupil image is lost. As a result, the accuracy of the phase difference detection process that utilizes correlation calculations significantly deteriorates.

Specifically, the component that has passed through the right pupil and the component that has passed through the left pupil are a convolution of a point spread function $PSF^L$ or $PSF^R$ and the profile of the object. Therefore, the component that has passed through the right pupil and the component that has passed through the left pupil produce parallax (phase difference). Since the pixel value r of the right-pupil image includes the component $I^R\cdot(\phi_R+\phi_{GR})$ that has passed through the right pupil and the component $I^L\cdot\phi_{GB}$ that has passed through the left pupil, the profile of the pixel value r obtained by adding up the components that produce parallax is not a profile that corresponds to only the right pupil, and is distorted. Since the pixel value b includes the component $I^L\cdot(\phi_{9B}+\phi_{GB})$ that has passed through the left pupil and the component $I^R\cdot\phi_{GR}$ that has passed through the right pupil, the profile of the pixel value b is distorted. When correlation calculations are performed on these profiles, it is impossible to implement accurate matching since the similarity has decreased due to distortion.

According to the third embodiment, the component $I^L\cdot\phi_{GB}$ (unnecessary component) that has passed through the left pupil is removed from the right-pupil image, and the component $I^R\cdot\phi_{GR}$ (unnecessary component) that has passed through the right pupil is removed from the left-pupil image. Since $\phi_{RB}=\phi_{GR}+\phi_{GB}$, the pixel values $\{r', b'\}=\{I^R\cdot\phi_R, I^L\cdot\phi_B\}$ that correspond to the spectral characteristics $\{\phi_R, \phi_B\}$ can be calculated by reducing or removing the component value that corresponds to the region $\phi_{RB}$ using the method described above in connection with the first embodiment and the like. Since the pixel values $\{r', b'\}$ are considered to be a pure component (light) that has passed through the right pupil and a pure component (light) that has passed through the left pupil, it is possible to obtain an undistorted profile. When the right-pupil image and the left-pupil image are respectively formed by the pixel values $\{r', b'\}$, it is possible to maintain the similarity between the right-pupil image and the left-pupil image, and implement a highly accurate phase difference detection process.

4.2. Imaging Device

Figure 11:
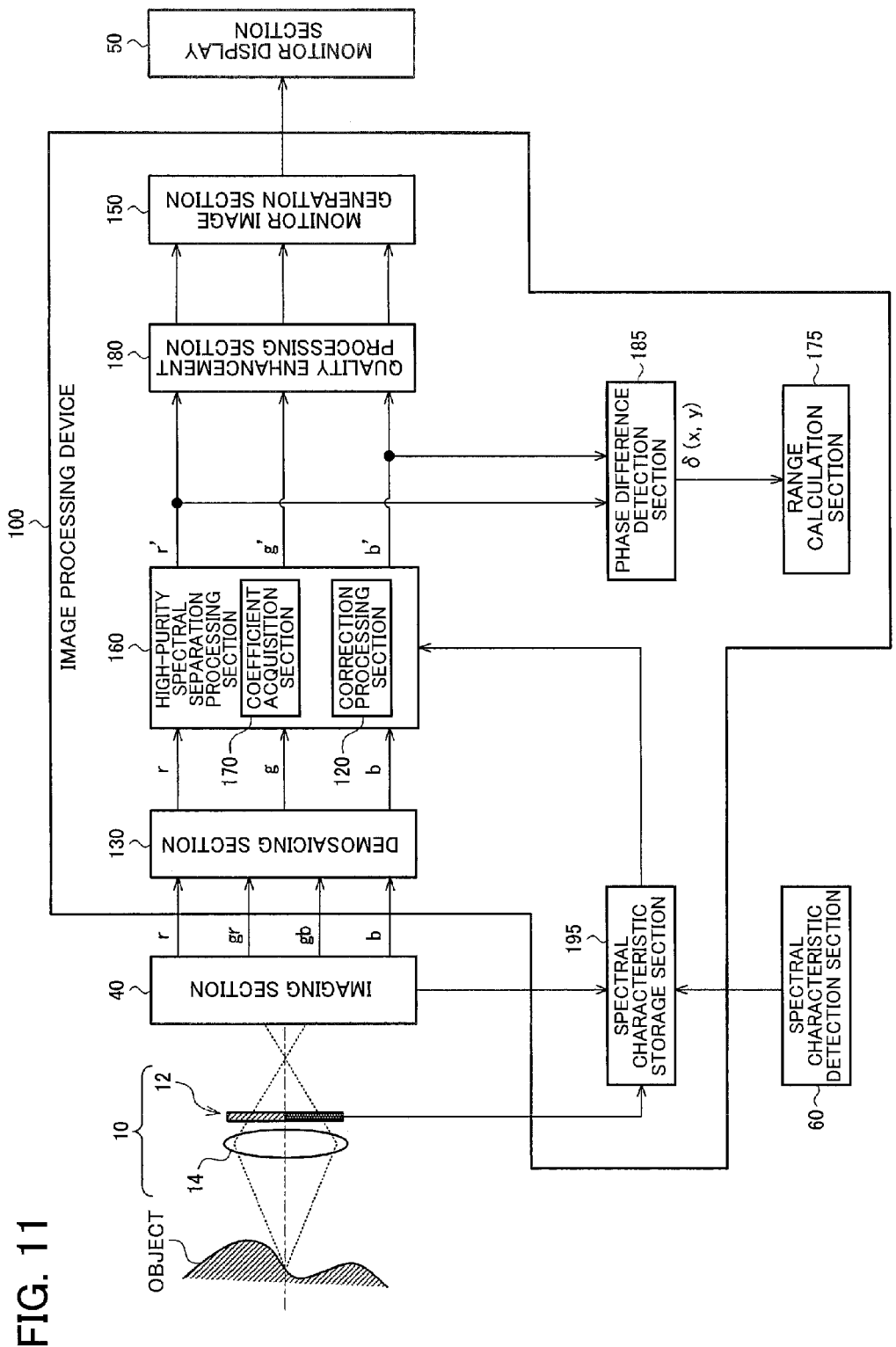
FIG. 11 illustrates a configuration example of an imaging device (third embodiment).

FIG. 11 illustrates a configuration example of the imaging device according to the third embodiment. The imaging device includes the optical system 10 (optical filter 12 and imaging lens 14), an imaging section 40, a monitor display section 50, a spectral characteristic detection section 60, and an image processing device 100. The image processing device 100 includes a demosaicing section 130, a monitor image generation section 150, a high-purity spectral separation processing section 160, a range calculation section 175, a quality enhancement processing section 180, a phase difference detection section 185, and a spectral characteristic storage section 195. Note that the same elements as those described above with reference to FIGS. 1 and 6 are indicated by the same reference signs (symbols), and description thereof is appropriately omitted.

The spectral characteristic storage section 195 stores the spectral characteristics $\{F_B, F_G, F_R\}$ determined by the spectral characteristics of the optical filter 12, the spectral characteristics of illumination light (or external light), and the spectral characteristics of the color filters of the image sensor. Alternatively, the spectral characteristic storage section 195 may store the coefficients $\alpha$ and $\beta$ calculated in advance from the spectral characteristics $\{F_B, F_G, F_R\}$.

The phase difference detection section 185 detects the phase difference $\delta(x, y)$ between the high-color-purity right-pupil image and the high-color-purity left-pupil image $\{r', b'\}$ output from the high-purity spectral separation processing section 160. The phase difference $\delta(x, y)$ is calculated on a pixel basis. Note that (x, y) represents the position (coordinates) within the image. For example, x corresponds to the horizontal scan direction, and y corresponds to the vertical scan direction.

The range calculation section 175 performs a three-dimensional measurement process based on the detected phase difference $\delta(x, y)$. Specifically, the range calculation section 175 calculates the distance to the object at each pixel position (x, y) from the phase difference $\delta(x, y)$ to acquire three-dimensional shape information about the object.

Examples of the application of the third embodiment include a high-speed phase detection AF process that utilizes the phase difference $\delta(x, y)$, a three-dimensional measurement process that utilizes ranging information, a three-dimensional display process, and the like.

Although only some embodiments of the invention and the modifications thereof have been described in detail above, those skilled in the art will readily appreciate that many modifications are possible in the embodiments and the modifications thereof without materially departing from the novel teachings and advantages of the invention. A plurality of elements described in connection with the embodiments and the modifications thereof may be appropriately combined to implement various configurations. For example, some elements may be omitted from the elements described in connection with the embodiments and the modifications thereof. Some of the elements described above in connection with different embodiments or modifications thereof may be appropriately combined. The configuration and the operation of the imaging device and the image processing device, and the methods (imaging method and image processing method) for operating the imaging device and the image processing device are not limited to those described in connection with the embodiments. Various modifications and variations may be made. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. An image processing device comprising:
a processor comprising hardware, the processor being configured to implement:
an image acquisition process that acquires an image captured by an image sensor, the image sensor including a first-color filter that has first transmittance characteristics, a second-color filter that has second transmittance characteristics, and a third-color filter that has third transmittance characteristics; and
a correction process that estimates a component value that corresponds to an overlapping region between the first transmittance characteristics and the third transmittance characteristics based on a pixel value that corresponds to a second color among a pixel value that corresponds to a first color, the pixel value that corresponds to the second color, and a pixel value that corresponds to a third color that form the image, and corrects the pixel value that corresponds to the first color, the pixel value that corresponds to the second color, and the pixel value that corresponds to the third color based on the component value that corresponds to the overlapping region,
the first transmittance characteristics, the second transmittance characteristics, and the third transmittance characteristics are distributions with respect to wavelength, the overlapping region is a region in which distributions with respect to wavelength overlap,
the second color being a color that is longer in wavelength than the first color and is shorter in wavelength than the third color, and
the processor being configured to implement the correction process that multiplies the pixel value that corresponds to the second color by a first coefficient based on the first transmittance characteristics and the third transmittance characteristics to calculate the component value that corresponds to the overlapping region.

2. The image processing device as defined in claim 1, the processor being configured to implement:
a coefficient acquisition process that acquires the first coefficient that maximizes similarity between the second transmittance characteristics multiplied by the first coefficient and the overlapping region.

3. The image processing device as defined in claim 2, the first coefficient that maximizes the similarity being the first coefficient that minimizes a Euclidean distance between a vector that corresponds to the overlapping region and includes transmittance components that respectively correspond to a plurality of wavelengths, and a vector that corresponds to the second transmittance characteristics multiplied by the first coefficient and includes transmittance components that respectively correspond to the plurality of wavelengths.

4. The image processing device as defined in claim 1, the processor being configured to implement the correction process that corrects the pixel value that corresponds to the first color by subtracting the component value that corresponds to the overlapping region from the pixel value that corresponds to the first color, and corrects the pixel value that corresponds to the third color by subtracting the component value that corresponds to the overlapping region from the pixel value that corresponds to the third color.

5. The image processing device as defined in claim 4, the processor being configured to implement the correction process that corrects the pixel value that corresponds to the second color by subtracting the component value that corresponds to the overlapping region, the pixel value that corresponds to the first color that has been corrected, and the pixel value that corresponds to the third color that has been corrected, from the pixel value that corresponds to the second color that is multiplied by a second coefficient based on the first transmittance characteristics and the third transmittance characteristics.

6. The image processing device as defined in claim 5, the processor being configured to implement:
a coefficient acquisition process that acquires the second coefficient that maximizes similarity of a short-wavelength-side part of the first transmittance characteristics and a long-wavelength-side part of the third transmittance characteristics, with the second transmittance characteristics multiplied by the second coefficient.

7. The image processing device as defined in claim 6, a given wavelength that is shorter than a wavelength that corresponds to a maximum transmittance represented by the first transmittance characteristics being a first wavelength, and a given wavelength that is longer than a wavelength that corresponds to a maximum transmittance represented by the third transmittance characteristics being a second wavelength, and
the second coefficient that maximizes the similarity being the second coefficient that minimizes a Euclidean distance between a vector that corresponds to the first transmittance characteristics and includes transmittance components that respectively correspond to a plurality of wavelengths shorter than the first wavelength, and a vector that corresponds to the second transmittance characteristics multiplied by the second coefficient and includes transmittance components that respectively correspond to the plurality of wavelengths, and a Euclidean distance between a vector that corresponds to the third transmittance characteristics and includes transmittance components that respectively correspond to a plurality of wavelengths longer than the second wavelength, and a vector that corresponds to the second transmittance characteristics multiplied by the second coefficient and includes transmittance components that respectively correspond to the plurality of wavelengths.

8. The image processing device as defined in claim 1, the processor being configured to implement the correction process that calculates an evaluation value that represents similarity of a candidate value for the component value that corresponds to the overlapping region, a value obtained by correcting the pixel value that corresponds to the first color using the candidate value, and a value obtained by correcting the pixel value that corresponds to the third color using the candidate value, with the pixel value that corresponds to the first color, the pixel value that corresponds to the second color, and the pixel value that corresponds to the third color, and calculates the component value that corresponds to the overlapping region by determining the candidate value that maximizes the similarity based on the evaluation value.

9. The image processing device as defined in claim 1, the processor being configured to implement:
a display control process that performs a control process that displays at least one of a high-sensitivity image and a high-color-reproduction image on a display, the high-sensitivity image being an image acquired by the image acquisition process, and the high-color-reproduction image being an image based on the pixel value that corresponds to the first color, the pixel value that corresponds to the second color, and the pixel value that corresponds to the third color that have been corrected by the correction processing process.

10. The image processing device as defined in claim 9, the processor being configured to implement:
a selection process that acquires external brightness information, and selects one of the high-sensitivity image and the high-color-reproduction image based on the external brightness information,
the display control process that performs the control process that displays the high-sensitivity image or the high-color-reproduction image selected by the selection process.

11. An image processing method comprising:
acquiring an image captured by an image sensor, the image sensor including a first-color filter that has first transmittance characteristics, a second-color filter that has second transmittance characteristics, and a third-color filter that has third transmittance characteristics; and
estimating a component value that corresponds to an overlapping region between the first transmittance characteristics and the third transmittance characteristics by multiplying a pixel value that corresponds to a second color (among a pixel value that corresponds to a first color, the pixel value that corresponds to the second color, and a pixel value that corresponds to a third color that form the image) by a first coefficient based on the first transmittance characteristics and the third transmittance characteristics, and correcting the pixel value that corresponds to the first color, the pixel value that corresponds to the second color, and the pixel value that corresponds to the third color based on the component value that corresponds to the overlapping region, the second color being a color that is longer in wavelength than the first color and is shorter in wavelength than the third color,
the first transmittance characteristics, the second transmittance characteristics, and the third transmittance characteristics are distribution with respect to wavelength, the overlapping region is a region in which distributions with respect to wavelength overlap.

* * * * *